United States Patent
Shenholz et al.

(10) Patent No.: US 6,822,641 B2
(45) Date of Patent: Nov. 23, 2004

(54) PRESENTATION BOARD DIGITIZER SYSTEMS

(75) Inventors: Gideon Shenholz, Tel Aviv (IL); Yitzhak Zloter, Holon (IL)

(73) Assignee: Luidia Inc., San Carlos, CA (US)

( * ) Notice: Subject to any disclaimer, the term of this patent is extended or adjusted under 35 U.S.C. 154(b) by 131 days.

(21) Appl. No.: 10/161,903

(22) Filed: Jun. 4, 2002

(65) Prior Publication Data

US 2002/0180713 A1 Dec. 5, 2002

Related U.S. Application Data

(63) Continuation-in-part of application No. 09/916,558, filed on Jul. 26, 2001, now Pat. No. 6,424,340, and a continuation of application No. 09/850,875, filed on May 7, 2001, now abandoned, which is a continuation of application No. 09/030,825, filed on Feb. 26, 1998, now Pat. No. 6,300,580, which is a continuation of application No. 08/811,947, filed on Mar. 5, 1997, now Pat. No. 6,292,177.

(30) Foreign Application Priority Data

Mar. 10, 1997 (IL) ................................................ 120417

(51) Int. Cl.[7] .......................... G08C 21/00; G09G 5/00
(52) U.S. Cl. ................ 345/177; 178/18.01; 178/18.13; 178/18.04
(58) Field of Search ................................ 345/173, 174, 345/177, 179, 176; 178/18.01, 18.03, 18.04, 18.05, 18.06, 18.07, 19.01, 19.02, 19.03, 19.04

(56) References Cited

U.S. PATENT DOCUMENTS 5,866,856 A * 2/1999 Holtzman ................. 178/19.01

* cited by examiner

Primary Examiner—Vijay Shankar
(74) Attorney, Agent, or Firm—Dov Rosenfeld; Inventek

(57) ABSTRACT

A presentation board digitizer system for large boards preferably employs at least three spaced-apart ultrasound receivers assemblies. A current position of an ultrasound transmitter is assigned as a weighted centroid of time-of-flight position measurements based on at least two pairs of receiver assemblies. The weighting used varies as a function of the position of the transmitter across the board. A preferred structure of an ultrasound receiver assembly for use in the system employs a pair of ultrasound receivers arranged side-by-side in a line perpendicular to the surface of the presentation board. The receivers are connected so as to generate a total output signal corresponding to the instantaneous sum of the ultrasound signals received at each, such that the receiver assembly is most sensitive to ultrasound signals incident from a plane adjacent to the presentation board. Also described are a transmitter device for use with a conventional pen in which the ultrasound transmitter is a cylindrical element lying coaxial with the pen and adjacent to its tip, and a jointed eraser structure.

10 Claims, 9 Drawing Sheets

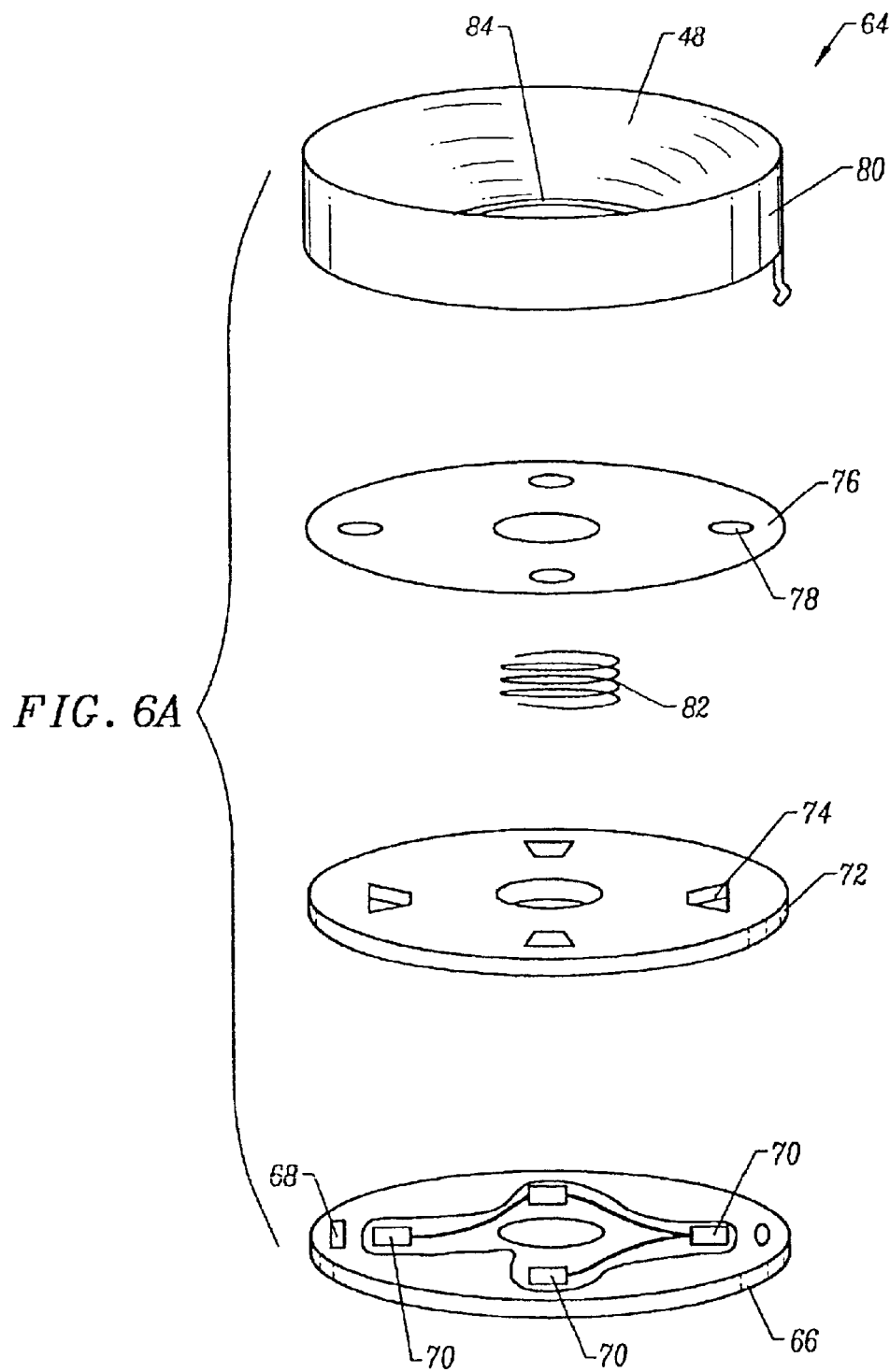

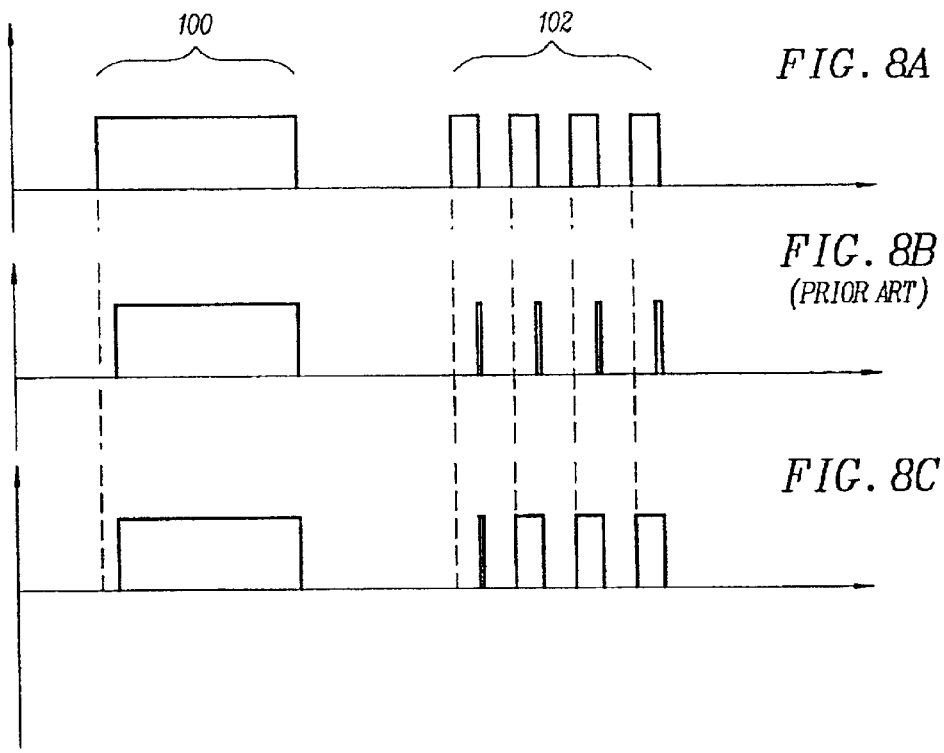
FIG. 8A
FIG. 8B
(PRIOR ART)
FIG. 8C
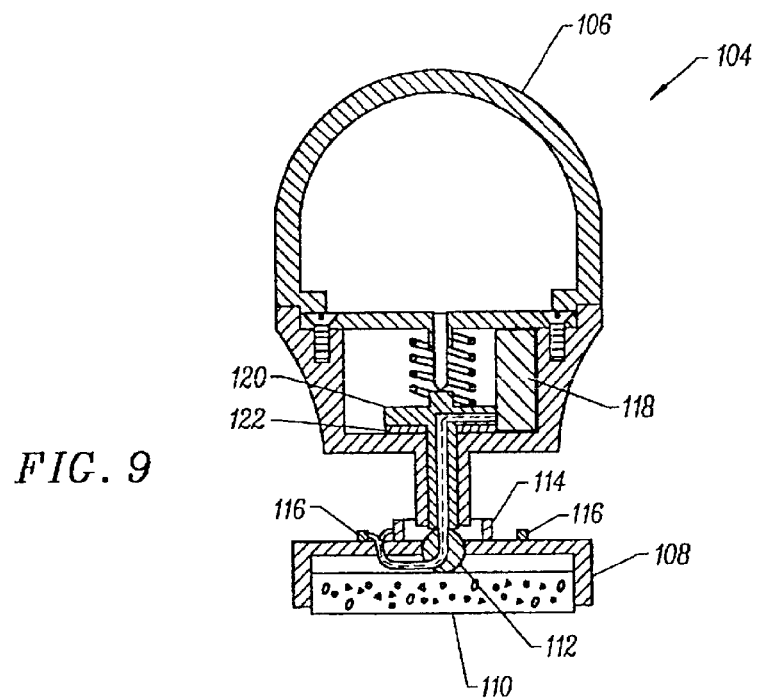
FIG. 9

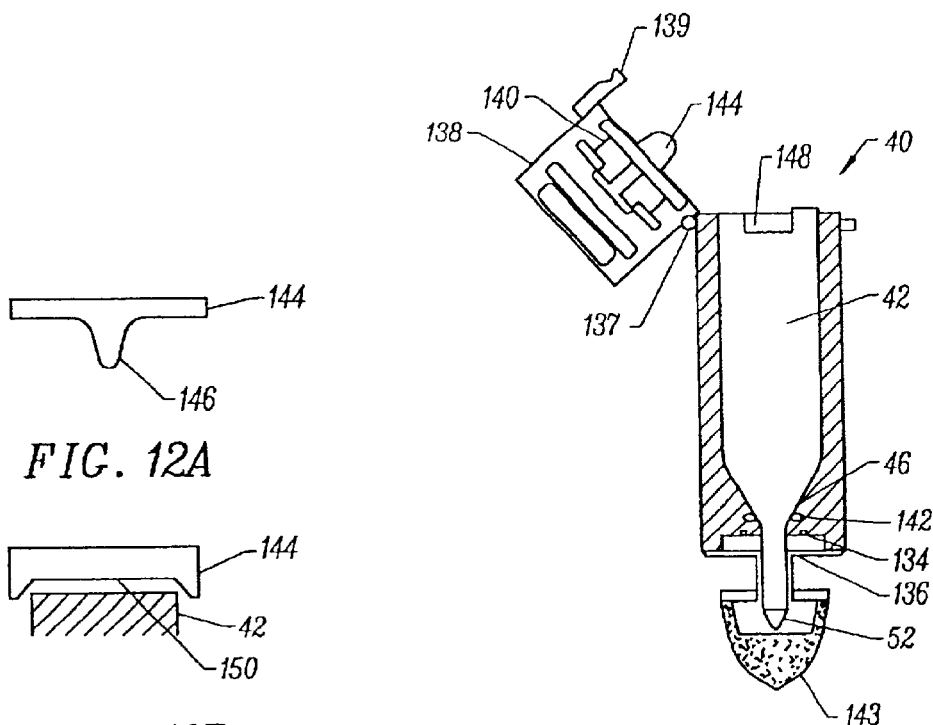
FIG. 12A
FIG. 12B
FIG. 11
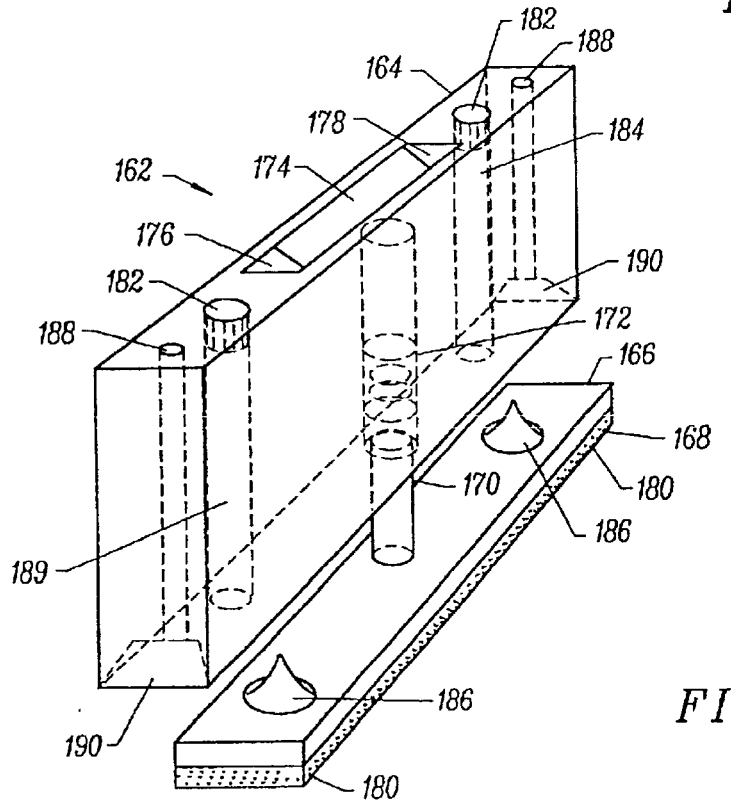
FIG. 13

PRESENTATION BOARD DIGITIZER SYSTEMS

CROSS REFERENCE TO RELATED APPLICATIONS

This application is a continuation of U.S. application Ser. No. 09/850,875, filed May 7, 2001 now abandoned, which is a continuation of U.S. application Ser. No. 09/030,825, filed Feb. 26, 1998, now U.S. Pat. No. 6,300,580, and a continuation-in-part of U.S. application Ser. No. 09/916,558, filed Jul. 26, 2001, now U.S. Pat. No. 6,424,340, which is a continuation of U.S. application Ser. No. 08/811,947, filed Mar. 5, 1997, now U.S. Pat. No. 6,292,177.

FIELD AND BACKGROUND OF THE INVENTION

The present invention relates to digitizers and, in particular, it concerns devices for use with conventional presentation boards and pens for digitizing lines drawn manually.

It is known to use various techniques for determining the position of a writing implement or stylus on a flat surface. Glenn et al. U.S. Pat. No. 4,564,928, Suzuki et al. U.S. Pat. No. 4,886,943, Kobayashi et al. U.S. Pat. Nos. 4,910,363 and 5,073,685, and Yoshimura et al. U.S. Pat. No. 5,097,102, all disclose systems in which a vibrating element associated with a pen transmits vibrations through the material of a board. The vibrations are detected by transducers attached to the board and the position of the pen is calculated from the transmission time of the vibrations through the board. These systems inherently function exclusively when the pen is in contact with the board such that vibrations are transferred to the board. As a result, no special mechanism is required to distinguish writing from non-writing pen movements.

These systems are generally inaccurate due to non-uniform transmission times through the board. In fact, they typically require highly specialized board structures which renders them expensive and inconvenient.

An alternative approach is the use of air-borne ultrasound signals. Examples of such systems are described in Mallicoat U.S. Pat. No. 4,777,329, Stefik et al. U.S. Pat. No. 4,814,552, Hansen U.S. Pat. No. 4,506,354, and De Bruyne U.S. Pat. No. 4,758,691. These systems employ various combinations of ultrasound transmitters and receivers arranged at two points fixed relative to a board and on a movable writing implement. The position of the movable implement is then derived by triangulation. The systems typically require an additional hard-wired or electromagnetic link between the movable implement and a base unit to provide timing information for time-of-flight ultrasound calculations. An additional switch is also required to identify when the movable element is in contact with the board.

These previously known systems are typically limited to relatively small boards. This is because of signal to noise ratio (SNR) limitations. The volume of ultrasound used cannot be very high without causing bothersome accompanying whistling noises. Additionally, in a wireless system, power considerations severely limit the transmitted volume. To generate reliable position information, the transmitter-to-receiver distance must therefore be kept small. Attempts to use different sets of receivers for different regions of a large board generally result in discontinuities when the movable element travels from one region to another.

Another shortcoming of these previously systems is their inability to reproduce rapid interrupted pen strokes, such as performed when drawing a dashed line. Typically, the transmitter or receiver element in the pen turns OFF when the pen is inactive and is re-activated each time the pen comes in contact with the board. The system then takes a fraction of a second to resynchronize before it responds correctly. In the case of short strokes, the length of the operative stroke may be comparable with the response time of the system, thereby giving very poor results.

An additional problem of the previously known airborne ultrasound digitizer systems is that the ultrasound transmitter or receiver element is mounted asymmetrically to the side of the drawing implement. As a result, the measured position is offset from the true drawing position in a direction which changes with rotation of the drawing implement. This may result in discontinuities and illegible writing in the digitized image when the drawing implement position is changed between strokes.

Finally, conventional presentation board digitizer systems are typically limited to use with specially produced writing implements. This renders them expensive since pens have a very limited lifetime. Even where the ink cartridge is separately replaceable, the components used must be of a very specific design to be compatible.

There is therefore a need for a reliable, low-cost, digitizer system which may be used with conventional presentation boards of all sizes for determining accurately the position of a drawing implement on the board. It would also be advantageous to have a transmitter device for use with presentation board which can be used with a wide range of conventional writing implements.

SUMMARY OF THE INVENTION

The present invention is of presentation board digitizer systems for use with presentation boards of all sizes which allow accurate reproduction of short pen strokes and which may be used with conventional writing implements.

According to the teachings of the present invention there is provided, an ultrasound receiver assembly for use in a presentation board digitizer system, the receiver assembly comprising: (a) a first ultrasound receiver located adjacent to the surface of the presentation board; and (b) a second ultrasound receiver displaced from the first ultrasound receiver in a direction substantially perpendicular to the surface of the presentation board, the first and second ultrasound receivers being connected so as to generate a total output signal corresponding to the instantaneous sum of the ultrasound signals received at each of the first and second ultrasound receivers such that the receiver assembly is most sensitive to ultrasound signals incident from a plane substantially adjacent to the presentation board.

According to a further feature of the present invention, the first and second receivers are connected in series.

In the context of an ultrasound-based digitizing system for identifying the position of an ultrasound transmitter associated with an element movable relative to a surface, the system having at least three spaced apart ultrasound receivers associated with the surface, there is also provided according to the teachings of the present invention, a method of analyzing outputs from the ultrasound receivers comprising the step of identifying as a current position a weighted centroid of at least a first calculated position derived from the outputs of a first pair of the receivers and a second calculated position derived from the outputs of a second pair of the receivers, wherein the weighting varies as a continuous function of approximate position relative to the ultrasound receivers.

According to a further feature of the present invention, the ultrasound receivers are substantially collinear, and the weighting varies linearly with distance in the direction of alignment of the ultrasound receivers over at least a given switch-over zone.

According to a further feature of the present invention, the weighted centroid approximates to the first calculated value when the movable element is within a first given region of the surface.

There is also provided according to the teachings of the present invention, a presentation board digitizer system for digitizing operative strokes of a drawing implement carrying an ultrasound transmitter against the board, the system comprising: (a) at least two ultrasound receivers mounted relative to the board for receiving air-borne ultrasound signals; (b) a transducer associated with the board so as to detect vibrations from the transmitter conducted through the board; and (c) a processor responsive to outputs from the at least two ultrasound receivers to calculate a current position of the transmitter, the processor being additionally responsive to an output from the transducer to identify contact between the drawing implement and the board, thereby identifying operative strokes of the drawing implement.

There is also provided according to the teachings of the present invention, a transmitter device for use with a system for digitizing operative strokes of a hand-held drawing implement, the drawing implement having a body and an operative tip, the transmitter device comprising: (a) a housing having a substantially cylindrical opening terminating at a first end in an annular wedge surface with a central bore, the housing receiving a portion of the body of the drawing implement with its operative tip extending from the central bore; (b) a retainer attachable to a second end of the opening to retain the drawing implement within the housing, the retainer having a spring element for biasing the drawing implement towards the annular wedge surface; and (c) a transmitter mounted relative to the housing proximal to the central bore.

According to a further feature of the present invention, the housing further includes: (a) a microswitch actuated by changes in pressure exerted on the annular wedge surface so as to be responsive to a force exerted on the operative tip of the drawing implement towards the housing; and (b) electronic circuitry responsive to the microswitch to affect operation of the transmitter at least when the microswitch indicates a force exerted on the operative tip of the drawing implement towards the housing.

According to a further feature of the present invention, the electronic circuitry operates the transmitter for a given time interval after the microswitch ceases to indicate a force exerted on the outer housing towards the operative tip of the drawing implement.

According to a further feature of the present invention, the given time interval is at least about half a second.

According to a further feature of the present invention, the transmitter transmits continuously, and the electronic circuitry is responsive to the microswitch to change a signal transmitted by the transmitter while the microswitch indicates a force exerted on the operative tip of the drawing implement towards the housing.

According to a further feature of the present invention, the transmitter is an ultrasound transducer.

According to a further feature of the present invention, there are also provided elements of an electromagnetic communications link, the elements being associated with the electronic circuitry.

There is also provided according to the teachings of the present invention, an ultrasound transmitter device for use with a system for digitizing the position of a hand-held drawing implement, the drawing implement having a central axis and an operative tip, the transmitter device comprising a substantially cylindrical piezoelectric transmitter element positioned coaxially with the drawing implement so as to circumscribe a part of the drawing implement proximal to the operative tip.

There is also provided according to the teachings of the present invention, an eraser device for use with a presentation board digitizer system, the eraser device comprising: (a) a handle; (b) an eraser element having a substantially flat eraser surface; and (c) a pivot joint connecting between the handle and the eraser element, the pivot joint having two degrees of rotational freedom such that, in use, the eraser element assumes an orientation with the eraser surface parallel to the presentation board surface substantially independent of the orientation at which the handle is held.

BRIEF DESCRIPTION OF THE DRAWINGS

The invention is herein described, by way of example only, with reference to the accompanying drawings, wherein:

FIG. 6A is an exploded perspective view of a microswitch structure, constructed and operative according to the teachings of the present invention, for use in the transmitter device of FIG. 5;

FIG. 8A is a plot of the output of a contact switch activated by operational contact between a drawing implement and a presentation board as a function of time;

FIG. 8B illustrates the recorded drawing implement operation time profile produced by prior art systems corresponding to the contact profile of FIG. 5A;

FIG. 8C illustrates the corresponding recorded drawing implement operation time profile produced according to a first embodiment of a presentation board digitizer system, constructed and operative according to the teachings of the present invention;

FIG. 9 is a side cross-sectional view of an eraser transmitter unit, constructed and operative according to the teachings of the present invention, for use with a digitizer system;

FIG. 11 shows a second embodiment of the transmitting device;

FIGS. 12A and 12B show two different forms of the upper biasing element; and

FIG. 13 shows a second embodiment of the eraser.

DESCRIPTION OF THE PREFERRED EMBODIMENTS

The present invention is of presentation board digitizer systems for use with presentation boards of all sizes which allow accurate reproduction of short pen strokes and which may be used with replaceable conventional pen elements.

The principles and operation of digitizer systems according to the present invention may be better understood with reference to the drawings and the accompanying description.

Figure 1:
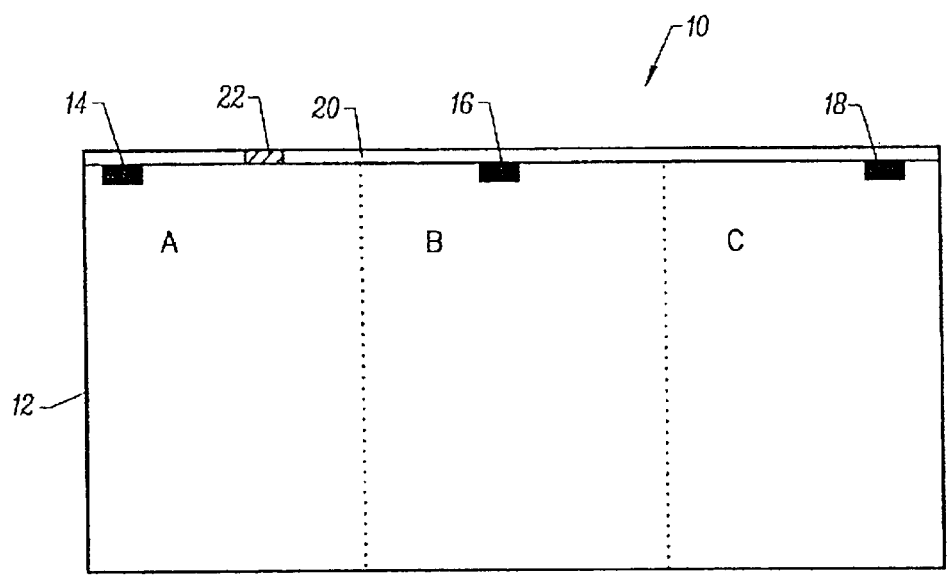
FIG. 1 is a schematic front view of a presentation board provided with a digitizer system, constructed and operative according to the teachings of the present invention, showing a switch-over zone between regions with different groups of ultrasound receivers.

Referring now to the drawings, FIG. 1 shows a presentation board digitizer system, generally designated 10, constructed and operative according to the teachings of the present invention, showing a switch-over zone between regions with different groups of ultrasound receivers.

Generally speaking, system 10 features a presentation board 12, which may be of any conventional type, provided with a plurality of ultrasound receiver assemblies 14, 16 and 18. Ultrasound receiver assemblies 14, 16 and 18 are preferably mounted in a strip 20 adapted for convenient attachment to presentation boards of differing sizes and thickness. This attachment may be achieved through clamps or clips of any type. Strip 20 also features an infrared (IR) receiver 22. A cover (not shown) is preferably provided for shielding ultrasound receiver assemblies 14, 16 and 18 and IR receiver 22 from sound and radiation originating away from board 12. System 10 operates with a movable element having both ultrasound and infrared transmitters, an example of which will be described in detail below. The present position of the movable element is derived from the time-of-flight (TOF) of ultrasound signals from the movable element to the receiver assemblies by triangulation. The IR signal provides synchronization information, as well as carrying additional information such as, for example, the color of a pen being used.

In principle, two ultrasound receivers are sufficient to uniquely determine the position of a movable element in contact with board 12. However, to provide reliable ultrasound reception over the entire area of a large board, system 10 employs more than one set of receivers. Thus, in the system as illustrated, a first set of receivers is defined as the pair of ultrasound receiver assemblies 14 and 16, and a second set of receivers is defined as the pair of ultrasound receiver assemblies 16 and 18. Clearly, the first set of ultrasound receivers so defined is well positioned for receiving an ultrasound signal from the transmitter when the movable element is in a first region denoted A, and the second set of ultrasound receivers is well positioned for receiving the signal when the movable element is in a second region denoted C. Thus, optimal precision and reliability is achieved by deriving the position of the movable element from the outputs of ultrasound receiver assemblies 14 and 16 when the movable element is in region A, and from the outputs of ultrasound receiver assemblies 16 and 18 when the movable element is in region C.

To avoid possible discontinuities in the tracking of the position of the movable element as it traverses board 12, preferred embodiments of the present invention provide a switch-over zone, denoted B, between regions A and C. Within switch-over zone B, the current position of the movable element is derived based on a weighted function of the positions calculated from the outputs of the first and second sets of receivers. Preferably, the weighted function varies smoothly with position across switch-over zone B, such that it approaches the value calculated from the first set of receivers when the movable element borders first region A and approaches the value calculated from the second set of receivers when the movable element borders second region C.

Figure 2:
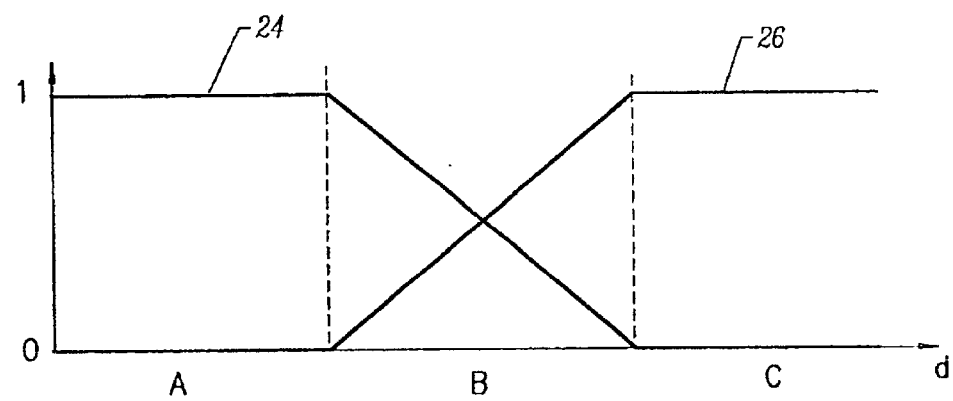
FIG. 2 is a plot illustrating the variation of relative weighting of position indications from two sets of ultrasound receivers in FIG. 1 as a function of position across the presentation board.

FIG. 2 shows a typical variation of the weighting function with distance across board 12. Here, plot 24 corresponds to the weighting factor applied to the first group of ultrasound receivers, and plot 26 corresponds to the weighting factor applied to the second group of ultrasound receivers. In this example, the variation within switch-over zone B is shown as linear. However, it should be appreciated that other more complex functions may be used as desired. Within region A, plot 24 is preferably constant at 1 and plot 26 is zero, whereas within region C, these values are reversed. Calculation of the current position of the movable element according to the system described requires calculation of weighting factors which are themselves a function of position. This apparent circularity of calculation may be circumvented in a number of ways. Most simply, since the position is measured repeatedly at short intervals, it is reasonable to assume that the new current position is a relatively small distance from the previously measured position. It is therefore reasonable to employ the last measured position for calculating the weighting factors for the subsequent measurement. Alternatively, or for the purposes of making an initial measurement, an approximate measurement may be made with some arbitrary weighting factor such as, for example, 0.5 for each set.

Although the concept of the switch-over zone has been illustrated in a simple implementation with only two sets of receivers, the concept can clearly be extended to more complex arrangements of multiple sets of receivers, both co-linearly and on opposite sides of a board. In the latter case, the weighting factor becomes a function of position in two dimensions, as will be clear to one ordinarily skilled in the art.

In addition to the switch-over zone algorithm, it is preferable that the ultrasound receivers are located sufficiently close to provide some degree of redundancy of measurement. This redundancy can then be employed (typically independent of the switch-over zone considerations) to provide a self test for accuracy and to identify any erroneous measurements which may occur temporarily.

Specifically, if receivers 14, 16 and 18 are collinear with equal spacing A, and the distance from each receiver as measured by TOF calculations is $s_1$, $s_2$ and $s_3$, respectively, simple trigonometry dictates that:

$$s_1^2 - 2s_2^2 + s_3^2 = 2A^2 \text{(constant)}$$

By calculating this sum whenever three simultaneous TOF measurements are available, the system can continuously test that it is functioning within an acceptable margin of accuracy. If a significant error is found, further statistically-based self-analysis algorithms may be implemented to identify which receiver produced the erroneous reading and to temporarily exclude that receiver from position calculations.

Figure 3:
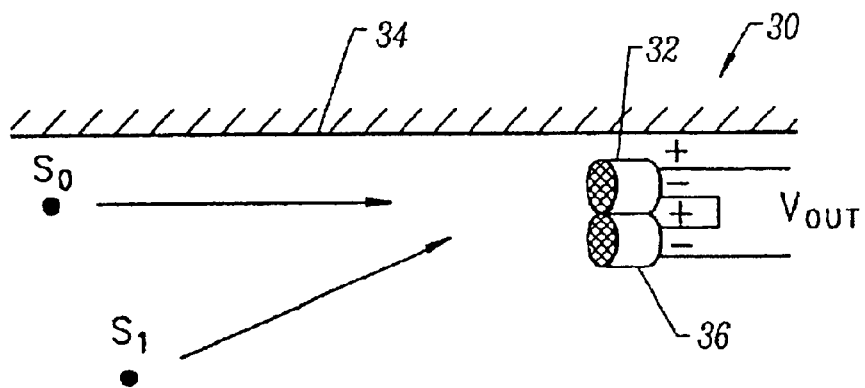
FIG. 3 is a side view of a twin ultrasound receiver assembly for use in a presentation board digitizer system constructed and operative according to the teachings of the present invention.
Figure 4:
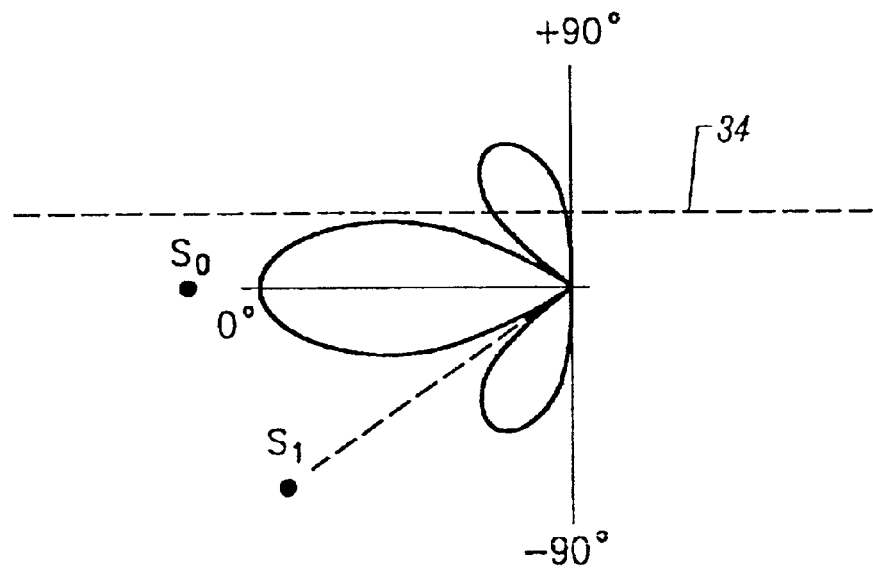
FIG. 4 is a schematic representation of the reception characteristic of the twin ultrasound receiver assembly of FIG. 3.

Turning now to FIGS. 3 and 4, a preferred design of ultrasound receiver assembly, generally designated 30, constructed and operative according to the teachings of the present invention, for use with presentation board digitizer systems will now be described. Assembly 30 may be used to advantage with a wide range of digitizer systems, including but not limited to system 10 described above.

Generally speaking, ultrasound receiver assembly 30 includes a first ultrasound receiver 32 located adjacent to the surface 34 of the presentation board, and a second ultrasound receiver 36 displaced from first ultrasound receiver 32 in a direction substantially perpendicular to surface 34.

First and second ultrasound receivers 32 and 36 are connected so as to generate a total output signal corresponding to the instantaneous sum of the amplitudes of ultrasound signals which they receive. Typically, for simple transducers, this is achieved by connecting them in series such that their output voltages are additive.

FIG. 4 shows a plot in polar coordinates of the variation of sensitivity of assembly 30 with angle of incidence in a plane perpendicular to the surface 34. The phase differences between ultrasonic vibrations reaching the two receivers, when added, result in pronounced variation of the sensitivity of assembly 30 with angle of incidence, as shown. Specifically, the maximum sensitivity of assembly 30 occurs in a plane central to the main lobe of FIG. 4 corresponding to a plane of symmetry between receivers 32 and 36. Signals arriving at the two receivers which are incident from this plane necessarily have zero path and phase difference, thereby producing a maximum amplitude output signal. Reception from the n=1 side lobes is preferably minimized by use of a cover element (not shown) which shields assembly 30 from sound incident at large angles from surface 34.

By arranging assembly 30 as described, the plane of maximum sensitivity is oriented substantially parallel and adjacent to surface 34. This is ideal for receiving signals incident from near the presentation board ($S_0$). Conversely, assembly 30 exhibits greatly reduced sensitivity to signals ($S_1$) incident from further away from the presentation board. These directional properties greatly help to isolate the ultrasound signals of importance to the digitizer system, increasing the signal-to-noise ratio. This allows the use of lower transmitter intensities and/or larger boards, and solves problems caused by a wide range of common noise sources. The sensitivity profile of assembly 30 parallel to surface 34 remains substantially omnidirectional similar to the profile of an individual receiver.

Figure 5:
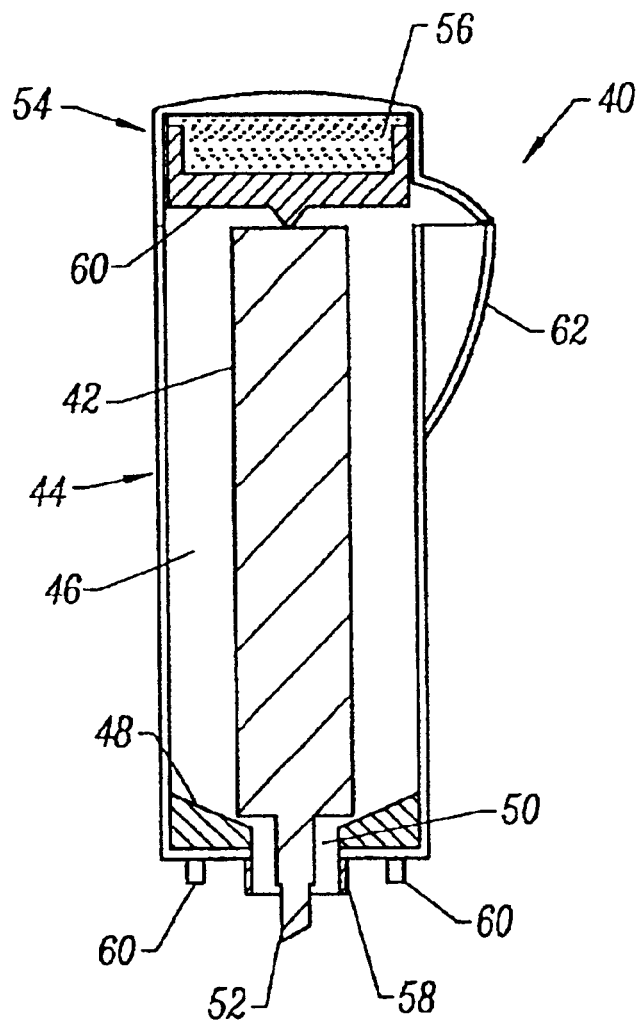
FIG. 5 is a side cross-sectional view of a transmitter device, constructed and operative according to the teachings of the present invention, used with a conventional drawing implement in a digitizer system.
Figure 6B:
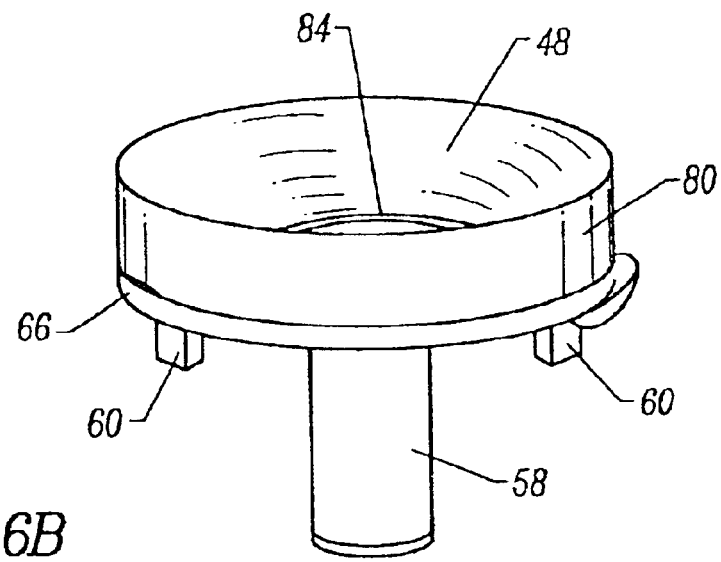
FIG. 6B is a perspective view of the microswitch structure of FIG. 6A assembled.
Figure 6C:
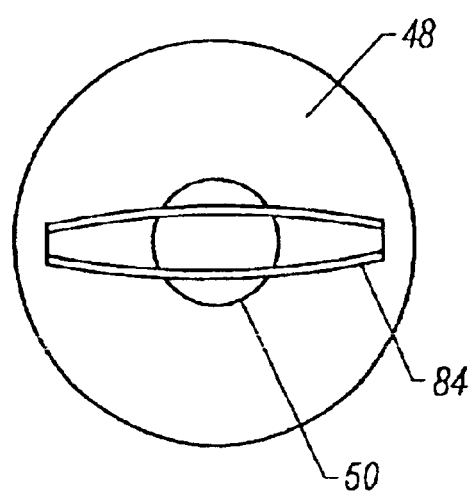
FIG. 6C is a top view of the microswitch structure of FIG. 6A showing a retaining spring arrangement.
Figure 7:
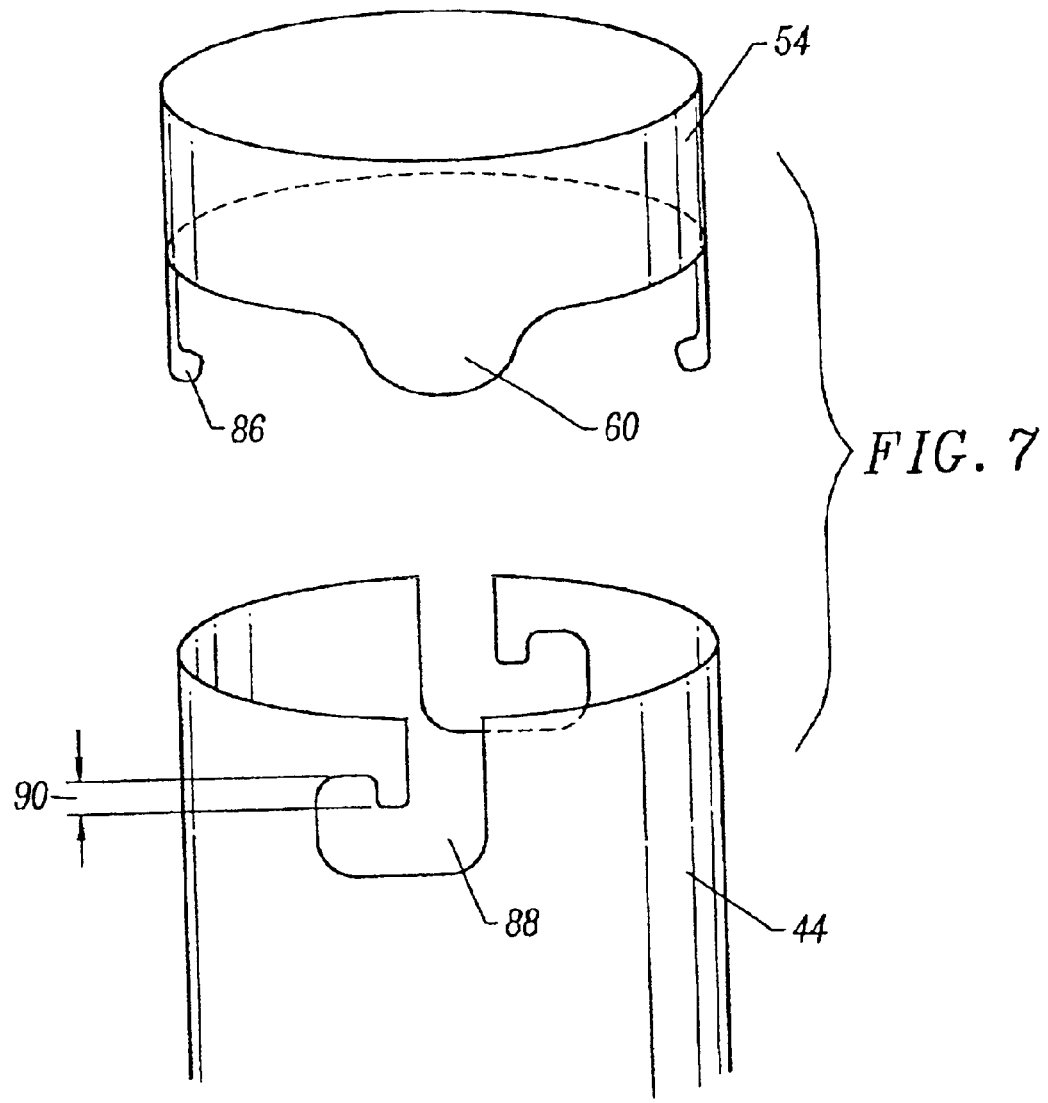
FIG. 7 is a schematic perspective view of a preferred structure for attachment of a retaining member to a housing for use in the transmitter device of FIG. 5.

Turning now to FIGS. 5–7, a preferred embodiment of a transmitter device, generally designated 40, constructed and operative according to the teachings of the present invention, for use with a drawing implement 42 in a digitizer system will be described. Transmitter device 40 may be used to advantage with a wide range of ultrasound based digitizer systems including, but not limited to, the presentation board digitizer systems described above.

Generally speaking, transmitter device 40 includes a housing 44 having a substantially cylindrical opening 46 which terminates at its lower end in an annular wedge surface 48 having a central bore 50. Drawing implement 42 is received within opening 46 with its operative tip 52 extending through bore 50.

Transmitter device 40 also includes a retainer 54 in the form of a cover attachable to the upper end of opening 46 to retain drawing implement 42 in position within housing 44. Retainer 54 features a spring element 56 for biasing drawing implement 42 towards annular wedge surface 48. An ultrasound transmitter 58 is mounted on the lower surface of housing 44 proximal to bore 50.

It is a particular feature of preferred embodiments of the transmitter device of the present invention that they can accommodate drawing implements of a range of lengths and widths. To this end, spring element 56 adjusts to any variations in length, and biases drawing implement 42 towards the lower end of housing 44 to ensure a correct position for use. This biasing, in conjunction with the shape of annular wedge surface 48, serves to center the front end of a drawing implement of any size or shape. In addition, spring element 56 is preferably provided with a shaped abutment surface 60 having features for centering the back end of a drawing implement. Typically, abutment surface 60 has an axial conical projection as shown for centering drawing implements by engaging a rear axial recess which is common to almost all presentation board pens. Alternatively, abutment surface 60 may be formed with a conical recess or other features for centering the back of a drawing implement.

The combination of annular wedge surface 48 and spring element 56 with abutment surface 60 serves to hold drawing implements of a range of lengths and widths in central alignment within cylindrical opening 46 without contacting the sides of housing 44. This arrangement makes transmitter device 40 insensitive to variations in drawing implement width. The avoidance of frictional contact with the sides of housing 44 is also important for efficient operation of a contact-sensing microswitch, as will be described below.

It is a particular feature of certain preferred embodiments of the present invention that ultrasound transmitter 58 is formed as a substantially cylindrical piezoelectric transmitter element attached to the lower end of housing 44 around central bore 50. This arrangement ensures that, when in use, the cylindrical transmitter is coaxial with drawing implement 42, circumscribing a part of drawing implement 42 proximal to operative tip 52. As a result of the symmetry of this arrangement, TOF measurements of the position of drawing implement 42 are completely independent of axial rotation of transmitter device 40. Furthermore, the position of operative tip 52 can be determined very precisely by adding the radial dimension of transmitter cylinder 58 to the value calculated from the TOF.

Transmitter device 40 also typically features at least one element of an electromagnetic communications link, typically an IR transmitter 60, and preferably about four such transmitters spaced around the lower end of housing 44. This ensures that at least one IR transmitter will be correctly oriented facing an IR receiver mounted on the presentation board at any time. It should be noted that a reversed arrangement in which an IR link is formed with a board-mounted transmitter and device 40 carries a receiver also falls within the scope of the present invention. Furthermore, the IR link may be dispensed with entirely if three ultrasound receivers are used to calculate each position. However, the arrangement described is preferred for providing higher precision than a purely ultrasound-based system whilst avoiding the need for complex IR signal processing circuitry in the transmitter device. Additionally, the IR transmitter allows transmission of extra information such as pen color and the like.

Ultrasound transmitter 58 and IR transmitters 60 are actuated under the control of electronic circuitry which is preferably battery powered. Both the electronic circuitry and the battery are preferably located in a compartment (not shown) of housing 44.

Transmitter device 40 preferably also features a switch for detecting contact between operative tip 52 and the surface of a writing board. This switch is associated with the electronic circuitry and is employed to actuate ultrasound transmitter 58 and IR transmitters 60. Preferably, the switch is formed as a microswitch positioned to respond to changes in the force applied by drawing implement 42 against annular wedge surface 48. FIGS. 6A–6C show a preferred construction for such a microswitch, generally designated 64, constructed and operative according to the teachings of the present invention.

Microswitch 64 is formed from three functional layers. First, a base layer 66 provides the two terminals of the microswitch, a single peripheral contact 68 and a set of common contacts 70, spaced-apart around the center of base layer 66. On top of base layer 66 lies a layer of conductive resilient foam 72 having cut-out holes 74 opposite contacts 70. A third rigid conducting layer 76 lies above foam layer 72. Conducting layer 76 has small conductive downward projections 78 aligned with holes 74. An upper cover 80, integrally formed with annular wedge surface 48, attaches loosely to base layer 66 to unify the structure while allowing sufficient vertical motion for operation of the switch. Each layer has a central bore, together corresponding to bore 50 of FIG. 5.

In a non-compressed state, conductive contact is made between peripheral contact 68 and foam layer 72 and between foam layer 72 and upper conducting layer 76. However, the switch remains open since the thickness of foam layer 72 prevents contact between projections 78 and inner contacts 70. When pressure is applied to compress microswitch 64, foam layer 72 becomes compressed until projections 78 come into contact with inner contacts 70, thereby closing the switch. In principle, release of the pressure allows the foam layer to return to its initial state, thereby breaking the circuit. However, in practice, the relaxation response time of the foam material is typically quite slow. For this reason, a spring 82 is mounted between base layer 66 and upper conductive layer 76 such that, when the pressure is released, upper conductive layer 76 is lifted immediately to break the circuit.

It will be clear that, when drawing implement 42 is not in use, spring element 56 urges drawing implement 42 downwards against annular wedge surface 48 to close microswitch 64. When drawing implement 42 is used to draw on a presentation board, a force is exerted on operative tip 52 of drawing implement 42 towards housing 44, causing drawing implement 44 to recoil slightly against spring element 56. This reduces the pressure exerted on annular wedge surface 48 the circuit of microswitch 64 opens. The electronic circuitry of transmitter device 40 is responsive at least to opening of microswitch 64 to affect a signal transmitted by transmitter device 40.

FIG. 6B shows microswitch 64 assembled, together with ultrasound transmitter 58 and IR transmitters 60. FIG. 6C shows a pair of spring elements 84 which are mounted within annular wedge surface 48 so as to grip the end of a drawing implement inserted through central bore 50. This ensures that the upper layer of microswitch 64 is sensitive to movements of drawing element 42.

It should be noted that the structure described here for microswitch 64 is by way of example only. Alternative structures may be used such as, for example, a switch based on a piezoelectric pressure sensor or the like.

Finally with regard to microswitch 64, it should be noted that correct operation of the switch depends on a degree of freedom of axial motion of drawing implement 42 against spring element 56. For this reason, it is important that spring element 56 is not fully compressed when retainer 54 is attached. FIG. 7 shows an example of a preferred structure for attachment of retainer 54 to housing 44, in which lateral projections 86 engage channels 88 which are shaped to provide a margin of release 90 when fully engaged. Margin of release 90 is designed to be at least sufficient to allow an operative range of motion of microswitch 64.

A second preferred embodiment of transmitter device 40 is shown in FIG. 11. Similarly to the preferred embodiment shown in FIG. 5, device 40 is intended for use with drawing implement 42. Transmitter device 40 also features housing 44 with cylindrical opening 46. However, cylindrical opening 46 now terminates at its lower end with a gasket 134. Gasket 134 features a central bore 136, through which operative tip 52 of drawing implement 42 extends.

In place of retainer 54, transmitter device 40 features a different type of retainer, which is a holder 138. Holder 138 is hingedly attached to the upper end of housing 44 with a hinge 137, and acts to hold drawing implement 42 substantially centered within opening 46. Holder 138 locks onto housing 44 by a locking pin 139. Holder 138 features a spring element 140 for biasing drawing implement 42 towards gasket 134. A second spring element 142, located near gasket 134, preferably helps further bias and center drawing implement 42 within opening 46. Preferably, spring element 140 is stronger than second spring element 142. A cover 143 is also provided for drawing implement 42.

To retain drawing implement 42 in the centered position, holder 138 preferably has an upper biasing element 144. Upper biasing element 144 can be in one of two shapes, as shown in FIGS. 12A and 12B. FIG. 12A shows upper biasing element 144 with an axial conical projection 146 for centering drawing implement 42 by engaging a rear axial recess 148 which is common to most presentation board pens. However, this embodiment is potentially restricted to use only with presentation board pens having axial recess 148 with a particular diameter, as axial recess 148 is not of uniform diameter between pens. Alternatively and preferably, upper biasing element 144 features a recess 150 into which the upper end of drawing implement 42 is inserted, as shown in FIG. 12B. This second embodiment has the advantage of being usable with most presentation board pens, since the external diameter of these pens is generally uniform.

The combination of upper biasing element 144, gasket 134 and spring elements 140 and 142 has the advantage of holding drawing implements of a variety of lengths and external diameters in central alignment within cylindrical opening 46 substantially without contacting the sides of housing 44. As described above for FIG. 5, the avoidance of frictional contact with the sides of housing 44 is also important for efficient operation of a contact-sensing microswitch 152.

Holder 138 also has a pressure-sensitive element 152, which has two parts, a pin 154 and a printed circuit board 156. Pin 154 contacts upper biasing element 144, sensing when contact is made between drawing implement 42 and the presentation board. In combination, these two parts allow transmitting device 40 to sense when contact has been made with the presentation board.

Transmitting device 40 also features ultrasound transmitter 58 and IR transmitter 60, similar to the embodiment shown in FIG. 5. Ultrasound transmitter 58 and IR transmitters 60 are actuated under the control of electronic circuitry 158 which is preferably battery powered by a battery 160. Both electronic circuitry 158 and battery 160 are preferably located in holder 138 of housing 44.

Turning to FIGS. 8A–8C, a preferred transmission profile of transmitter device 40 will now be described. FIG. 8A represents a contact profile of drawing element 42 as measured by microswitch 64 as a function of time. During a first period 100, drawing implement 42 is kept in contact with the presentation board for an extended period to draw a continuous shape. Then, during a second period 102, drawing implement 42 is used in a series of short, separate strokes to form a dashed line.

As mentioned above, the prior art digitizer systems suffer from a significant delay in picking-up the beginning of each pen stroke. This is because the transmitters are actuated each time pen contact is made and interrupted each time pen contact ceases. As a result, each pen stroke starts with a dead time during which the receiver system synchronizes and locks on to the transmitted signals. The results of this system are shown in FIG. 8B. During period 100, the effects are not very serious. There is a small signal loss at the beginning of the period, but the great majority of the stroke is recorded well. During period 102, however, the system response time is comparable to the length of the pen strokes. As a result, the dashed line is almost completely lost.

To solve this problem, the present invention is preferably designed to maintain synchronization between transmitter device 40 and the receiver system for a given period after the end of each pen stroke. Typically, this is achieved by the electronic circuitry continuing to operate IR transmitters 60 for the given time interval after microswitch 64 ceases to indicate a force exerted on the outer housing towards the operative tip of the drawing implement. False drawing signals can be avoided either by the electronic circuitry disabling ultrasound transmitter 58 during the delay period, or by changing the content of the IR signal to indicate a non-contact pen state. The delay period is typically at least about half a second, and preferably between about 1 and about 2 seconds.

FIG. 8C illustrates the response profile of transmitter device 40 as described. During an initial period of a single pen stroke, its response is not dissimilar from that of the prior art. However, when short repeated strokes are encountered, transmitter device 40 maintains synchronization between successive strokes, thereby providing an accurate response immediately on switching of microswitch 64.

Turning now to FIG. 9, an eraser, generally designated 104, constructed and operative according to the teachings of the present invention, for use with a presentation board digitizer system will be described. A major problem with eraser elements for use with digitizer systems is the common practice of employing only a part of the eraser surface. Since the digitizer is typically unable to distinguish between flat contact and edge contact of the eraser, the digitized image frequently shows a much greater erased area than has actually been cleared from the presentation board itself. To solve this problem, eraser 104 is constructed such that its eraser surface is self-orienting to lie parallel to the presentation board surface. This ensures that the contact area of the eraser element is always precisely defined.

Thus, eraser 104 has a handle 106 and an eraser element 108 which has a substantially flat, eraser surface 110. Handle 106 and eraser element 108 are connected by a pivot joint 112, typically in the form of a ball-and-socket, which has two degrees of rotational freedom. The use of pivot joint 112 ensures that, in use, eraser element 108 assumes an orientation with eraser surface 110 parallel to the presentation board surface substantially independent of the orientation at which handle 106 is held.

Eraser 104 also features transmitter device features analogous to those of transmitter device 40 described above. These include a cylindrical ultrasound transmitter element 114, a number of IR transmitters 116 and an electronic circuitry/battery block 118. Connection of handle 106 to pivot joint 112 is through a sprung pin assembly 120. A pressure sensing microswitch 122 is mounted in the seat of pin assembly 120 for sensing contact pressure between handle 106 and eraser element 108. Wiring from electronic circuitry 118 to transmitters 114 and 116 is preferably located axially within pin assembly 120 and passing through pivot joint 112.

Eraser surface 110 is preferably circular, and cylindrical ultrasound transmitter element 114 is preferably arranged such that its axis is aligned with the center of eraser surface 110. By addition of the radius of the cylinder to the TOF measurements, this arrangement allows precise identification of the center of the circle of erasure, and hence of the entire area covered by eraser surface 110. Eraser 104 thus provides a much higher degree of precision and determination of the erased area than can be achieved by prior art devices.

A second embodiment of an eraser 162 is shown in FIG. 13. Eraser 162 is designed for erasing a small area, particularly an area of narrow width, and can thus be described as a "narrow-band eraser." Similarly to eraser 104, eraser 162 has a handle 164 and an eraser element 166 which has a substantially flat eraser surface 168. However, handle 164 is connected to eraser element 166 by a pressure-sensitive element 170. Pressure-sensitive element 170 includes a spring 172, such that when at least a portion of eraser surface 168 contacts the presentation board, a signal is transmitted to a touch switch 174. Touch switch 174 preferably includes a printed circuit board 176 and electrical circuitry 178, which enable touch switch 174 to identify when eraser surface 168 is contacting the presentation board. This is similar to pressure sensing microswitch 122 of eraser 104.

A second method of identification of touching of the presentation board uses the following features of eraser 162. Eraser surface 168 has two contact microswitches 180, preferably located substantially at each end of eraser surface 168, which are substantially similar in function to contact microswitch 64 of FIG. 6. If only one contact microswitch 180 senses contact with the presentation board, only a small area will be erased, such as a letter, for example. If, however, both contact microswitches 180 sense contact with the presentation board, a zone with the length and width of eraser surface 168 will be erased.

Similarly to eraser 104, eraser 162 also has transmitter device features. Specifically, eraser 162 has at least one, and preferably two, cylindrical ultrasound transmitters 182, located in handle 164, preferably substantially at each end of handle 164. Since each ultrasound transmitter 182 is located in handle 164, eraser 162 also features an ultrasound conductor tube 184 for each ultrasound transmitter 182. Each ultrasound conductor tube 184 goes from handle 164 to eraser element 166, such that the ultrasound signal from each ultrasound transmitter 182 is transmitted downward. Eraser 162 also has a reflector cone 186 for each ultrasound transmitter 182. Reflector cone 186 is preferably located in eraser element 166, reflecting the ultrasound waves in all directions.

Eraser 162 also has two infrared transmitters 188, preferably located substantially at each end of handle 164. Each infrared transmitter 188 has an infrared reflector 190, also located in handle 164, which serves a similar function as reflector cone 186.

Although one particular embodiment of these transmitter device features has been described, it will be appreciated that a number of different embodiments are possible, substantially as described above for the transmitter device.

Figure 10:
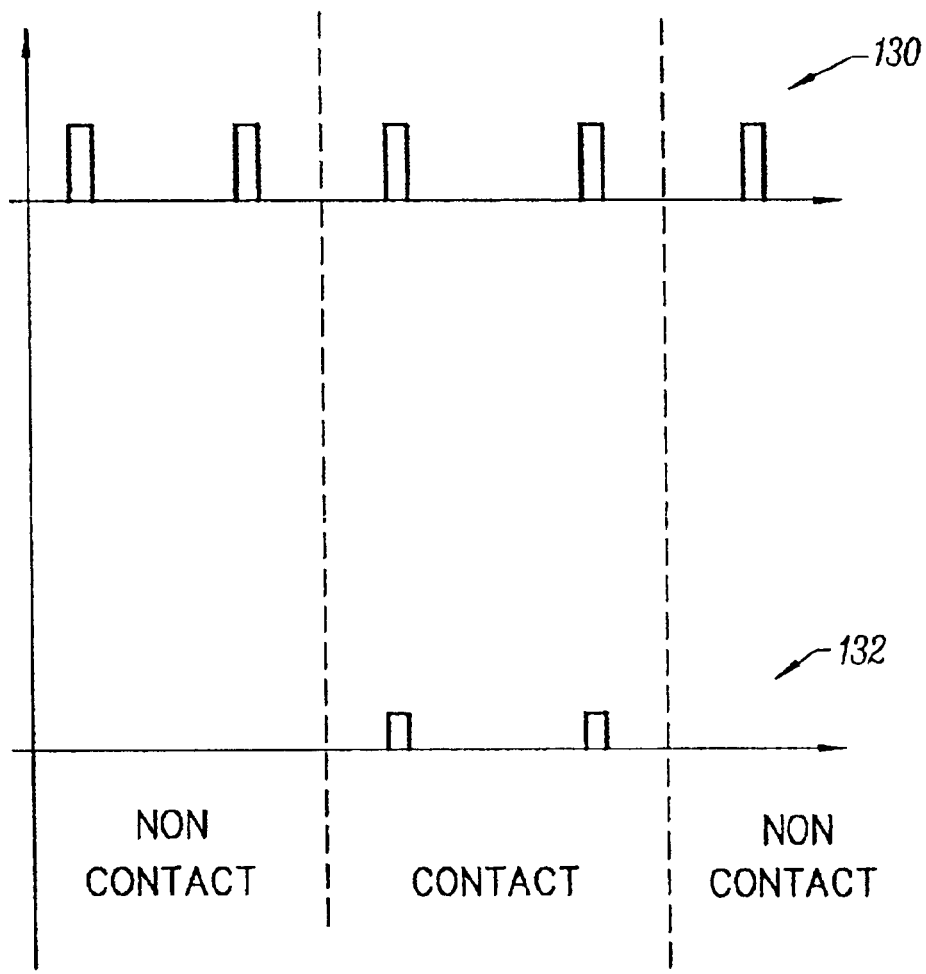
FIG. 10 illustrates the signals received by air-borne ultrasound receivers and a board-mounted transducer, respectively, according to a second embodiment of a presentation board digitizer system, constructed and operative according to the teachings of the present invention.

Turning now to FIG. 10, this shows the principle of operation of a further embodiment of a transmitter device, constructed and operative according to the teachings of the present invention, for use with a presentation board digitizer system. This device is generally similar to transmitter device 40 described above except that it dispenses with microswitch 64, instead identifying pen-board contact by transmission of vibrations through the board.

As mentioned earlier, digitizer systems employing through-the-board transmission suffer from poor accuracy and dependency on specific board design. However, they have a major advantage of inherent pen-board contact identification. The device of the present invention combines this feature with all the advantages of precision and independence from board design provided by air-borne ultrasound systems, using the through-the-board detection solely for contact detection.

Thus, this embodiment may be used with a presentation board system essentially similar to that of FIG. 1, with the addition of a transducer associated with the board (not shown) for detecting vibrations from the transmitter conducted through the board. The processor of the receiver system is then responsive to outputs from the airborne ultrasound receivers to calculate a current position of the transmitter, and to the output from the board mounted transducer to identify contact between the drawing implement and the board, thereby identifying operative strokes of the drawing implement.

The principle of this system is shown clearly in FIG. 10 in which plot 130 represents the signal from one of the ultrasound receiver assemblies and plot 132 represents the signal from the board-mounted transducer. Plot 130 shows a continuous sequence of pulses since the transmitters operate continuously as long as the pen is in use, according to this embodiment. Plot 132, on the other hand, only registers corresponding pulses during a period that the pen is in contact with the board. Although the signal quality of plot 132 is typically inferior, it is more than sufficient for identification of contact or non-contact conditions.

It will be appreciated that the above descriptions are intended only to serve as examples, and that many other embodiments are possible within the spirit and the scope of the present invention.

What is claimed is:

1. A system for use with a surface, the system comprising:
   a plurality of receiver assemblies comprising a first ultrasound receiver located adjacent to the surface, and a second ultrasound receiver displaced from the first ultrasound receiver in a direction substantially perpendicular to the surface, the first and second ultrasound receivers being connected to generate a total output signal corresponding to the instantaneous sum of the ultrasound signals received at each of the first and second ultrasound receivers;
   an attachable strip, wherein the plurality of receiver assemblies are mounted to the strip; and
   a movable transmitter device comprising an ultrasound transmitter.

2. The system of claim 1, further comprising:
   an infrared receiver mounted on the strip; and
   wherein the movable transmitter device further comprises an infrared transmitter.

3. The system of claim 1, wherein the movable transmitter device further comprises:
   a housing comprising a substantially cylindrical opening terminating at a first end comprising an inner housing surface having a central bore, the housing receiving a portion of a drawing implement that comprises a body, a back end, a front end opposite the back end, and an operative tip that extends through the central bore,
   a retainer attachable to a second end of the opening to retain the drawing implement within the housing, the retainer having a spring element for biasing the drawing implement towards the inner housing surface; and
   wherein the ultrasound transmitter is mounted relative to the housing proximal towards the central bore.

4. The system of claim 3, wherein the ultrasound transmitter is a substantially cylindrical piezoelectric transmitter attached to the housing around the central bore.

5. The system of claim 3, wherein the housing further comprises:
   a microswitch actuated by changes in pressure exerted on the surface so as to be responsive to a force exerted on the operative tip of the drawing implement towards the housing; and
   electronic circuitry responsive to the microswitch to affect operation of the ultrasonic transmitter at least when the microswitch indicates a force exerted on the operative tip of the drawing implement towards the housing.

6. A process for use with a surface, the process comprising:
   providing at least three ultrasound receivers associated with the surface;
   transmitting an ultrasound signal from an element movable relative to the surface;
   receiving the ultrasound signal at the plurality of ultrasound receivers; and
   analyzing outputs from the ultrasound receivers comprising the step of identifying as a current position a weighted centroid of at least a first calculated position derived from the outputs of a first pair of the receivers and a second calculated position derived from the outputs of a second pair of receivers, wherein the weighting varies as a function of approximate position relative to the ultrasound receivers.

7. The process of claim 6, further comprising transmitting an infrared signal from the element.

8. The process of claim 7, wherein the infrared signal comprises synchronization information.

9. The process of claim 7, wherein the infrared signal comprises pen color information.

10. The process of claim 6, wherein the ultrasound receivers are substantially collinear, and wherein the weighting varies linearly with distance in the direction of alignment of the ultrasound receivers over at least a given switch-over zone.

* * * * *